(No Model.)

G. J. FERGUSON.
CAR COUPLING.

No. 356,111. Patented Jan. 18, 1887.

WITNESSES:
Fred G. Dieterich
P. B. Turpin

INVENTOR:
Geo. J. Ferguson
BY Munn & Co.
ATTORNEYS.

UNITED STATES PATENT OFFICE.

GEORGE J. FERGUSON, OF GREENVILLE, TEXAS, ASSIGNOR OF ONE-EIGHTH TO EDWIN F. STAHL AND SAMUEL BRANTHOFFER, OF SAME PLACE, AND ALMER L. DOWNER, OF PITTSBURG, TEXAS.

CAR-COUPLING.

SPECIFICATION forming part of Letters Patent No. 356,111, dated January 18, 1887.

Application filed June 1, 1886. Serial No. 203,840. (No model.)

*To all whom it may concern:*

Be it known that I, GEORGE J. FERGUSON, a subject of the Queen of Great Britain, residing at present at Greenville, in the county of Hunt and State of Texas, have invented a new and Improved Car-Coupling, of which the following is a full, clear, and exact description.

This invention is an improved car-coupling, and has for an object to provide a simple construction which will supply all the necessary and desirable features in a car-coupling by which the draft will be exerted against both the upper and lower halves of the draw-head. A link may be coupled from both the coupled or uncoupled position of the hook to connect the draw-head, the coupling-hook, and the devices for operating the latter in such manner that the coupling will be secure and will not be affected by the movements of the draw-head.

The invention has for its objects other improvements; and it consists in certain features of construction and novel combinations of parts, as will be hereinafter described.

Figure 1:
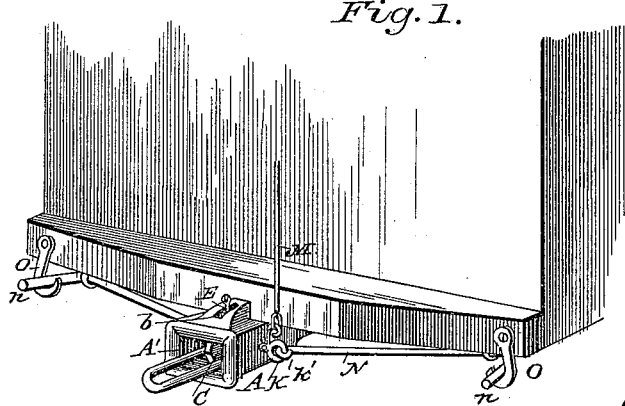
Figure 2:
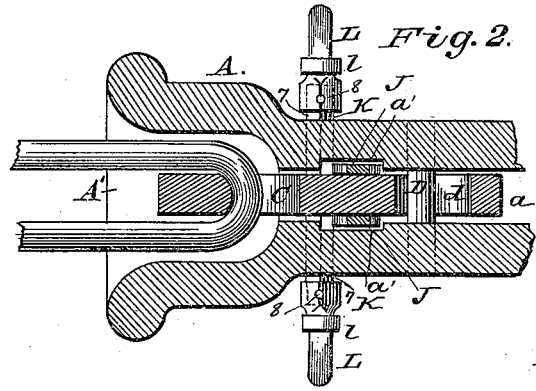
Figure 4:
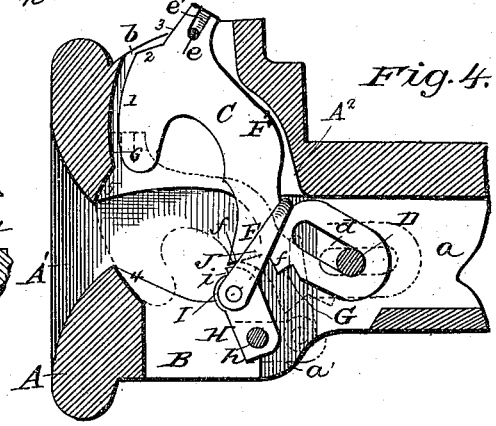
Figure 3:
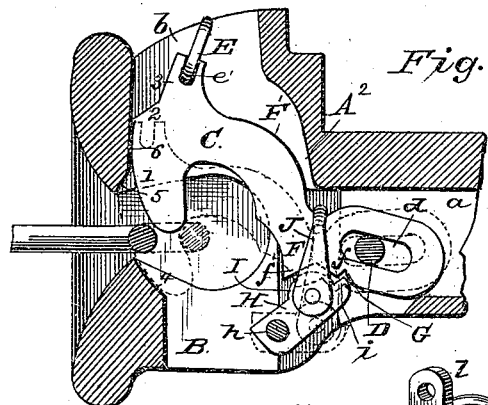
Figure 6:
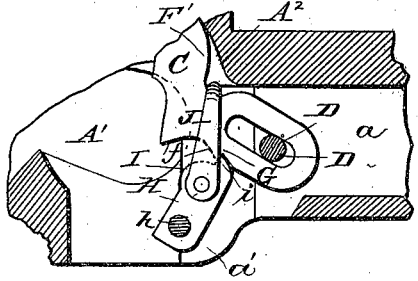
Figure 5:
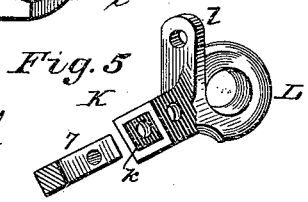

In the drawings, Figure 1 is a perspective view of a portion of a car provided with my improved coupling. Fig. 2 is a partial longitudinal section of the draw-head with the coupling devices in place. Fig. 3 is a vertical section of the draw-head, drawn alongside of the coupling devices, showing in full lines a link as in elevating the coupling-hook in entering the draw-head, and in dotted lines the parts in coupled position. Fig. 4 is a view similar to Fig. 3, the devices being shown as locked in uncoupled position in full lines and in coupled position in dotted lines. Fig. 5 is a detail perspective view of the stem of the cam, substantially as set forth. Fig. 6 shows the arrangement for preventing the parts being automatically locked out of coupled position.

The draw-head A is usually suitably supported so it may have a slight longitudinal movement, being supported by springs in any well-known manner. In this draw-head I form the main mortise A', in rear and above and below which is extended a narrow mortise or channel, a, which is widened laterally at a' a', to receive the stirrup forming the connection between the coupling-hook and the grapple. A slot or opening is formed through the bottom of the draw-head at B, opening into the mortise A' and channel a, to permit the coupling devices to be inserted from below the draw-head, while an opening, b, is formed through the top of the draw-head, through which the coupling-hook may be manipulated by hand.

The coupling-hook C has its front edge formed with inclined faces 1 and 2 and an approximately vertical face, 3, which faces 1, 2, and 3 bear against corresponding faces, 4, 5, and 6 in the draw-head. A particular advantage resulting from the use of the vertical face, in connection with the inclined faces, is that thereby the hook is held from any rocking movement or working on its securing-stud, and the latter will not consequently become worn, as in the ordinary construction. By preventing this working movement of the hook wear on the front edge of same and the corresponding portion of the draw-head will also be avoided.

By the construction described it will be seen I am able to use a small link-opening, and to form the front end wall of the draw-head stronger than in the devices of ordinary construction, and still permit the necessary movement of the link. Near its rear end the hook C is formed with a slot, d, which fits over a bolt or stud, D, which serves to secure the hook in the draw-head, and permits it to have a limited longitudinal movement, so its front edge may move to and against the inner side of the front wall of the draw-head, in order that the draft may be borne by the draw-head.

Should the front of the draw-head become broken by accident or otherwise, the stud D will bear the strain of draft while the car is being drawn to the repair-shop. At the upper side of the forward end the hook is provided with a ring, E, by which it may be elevated by hand to uncouple. This ring is preferably secured by passing it through an opening, e, and lapping it in grooves e', extended upward from said opening, so the ring will preserve its desired upright position.

On its under side the hook is formed with a bearing-face, F, formed preferably of two wings or sections, $ff$, and in rear of such face F, I form the stop-shoulder G. Below the hook the cam H is pivoted at $h$ to the draw-head, and has its face I arranged to bear against the face F of the hook.

The wall of the channel $a$ at $H^2$ forms an abutment, against which the upper surface of the coupling-hook at F' bears to direct the hook forward when the hook is elevated. By throwing this hook forward I insure the point of same entering the link before the recoil can throw the link forward out of the draw-head.

To provide for locking of the hook in uncoupled position, the cam is provided with a projection, $i$, which, when the cam is moved to its extreme forward position, binds against the bearing-face F at or near the forward end of same, and the point of contact of such face and projection is in front of the stirrup J, which connects the hook and cam, as shown in full lines in Fig. 4, so the hook cannot be jarred into coupled position. This stirrup J forms a loose connection between the cam and hook, being looped over the latter and pivotally connected eccentrically to the former, the said stirrup operating in the widened portion $a'$ of the channel $a$.

Manifestly, instead of widening channel $a$ at $a'$, the sides of the hook might be channeled out to receive the arms or side bars of the bail-like stirrup. To prevent the cam from being adjusted automatically into locked position when the hook is elevated by hand or by a link entering the draw-head, I form the projection $i$, as shown, to engage the shoulder G, and so prevent the parts from being locked in uncoupled position, as will be understood from Figs. 3 and 6, except when the hook is elevated by the cam. To lock the hook coupled, the cam is turned to the position indicated in dotted lines, Fig. 4, when the stirrup will prevent the hook from uncoupling, the cam being held by the devices presently described.

The cam is provided with stems K, which may be formed integral with said cam, but are preferably separate therefrom, and socketed at K to receive angular projections 7 on the cam, to which projections 7 are secured by pins 8. These stems extend laterally, and are formed outside the draw-head with eyes L and with lateral crank-like lugs $l$. Connections M, usually rods, as shown, are secured to lugs $l$, and extend to the top of the car, in order that the cam may be adjusted from the top of the car.

The shafts N have at one end knuckle-like joints with stems K, preferably by looping the ends of the shafts through the eyes L. At their opposite or outer ends the shafts are journaled to the car and have crank-arms $n$. Hooks O are pivoted to the car and serve as latches, being arranged to engage crank-arms $n$ and secure the shafts and through the latter the cams in position to lock the hook in coupled position. Thus a through train, when coupled up, may be locked coupled, so that no accidental uncoupling may occur in transit.

It will be seen that my coupling may be manipulated from either side of or the top of the car and by hand.

In operation the devices may be locked in or out of couple, and when locked out of couple the parts are so arranged that no damage can result to them from a link entering the draw-head. By the cam and the stirrup forming a loose connection between it and the hook the hook may be moved up or down when a link is coupled to lower or elevate the outer end of such link to properly enter an approaching draw-head.

It will be understood that the devices will only automatically couple when the said parts are in closed position or in position for coupling.

It will be understood that this coupling does not require any greater length of draw-head than that commonly used, and, except for coupling and uncoupling by hand, the top of the draw-head may be closed.

Having thus described my invention, what I claim, and desire to secure by Letters Patent, is—

1. The combination of the draw-head, the coupling-hook supported therein and having a limited longitudinal movement, the front edge of said hook being formed with inclined faces 1 and 2, and a vertical face, 3, arranged to engage proper faces in the draw-head, the forward movement of said hook being limited by inclined faces 1 and 2 and vertical face 3, and its backward movement by bolt or stud D and its upward movement by engagement of surface F' with surface $A^2$, substantially as set forth.

2. The combination of the draw-head, the coupling-hook, the cam adapted to elevate said hook and lock it in uncoupled position, and a connection between said cam and hook whereby the latter may be moved to elevate the link or be locked in coupled position, the said hook being movable slightly backward, then upward and forward into uncoupled position, substantially as set forth.

3. The combination, with the draw-head and the coupling-hook, of the cam and a bail-shaped stirrup looped over the hook and connected with the cam, substantially as set forth.

4. The combination of the draw-head, the coupling-hook, the cam connected with and adapted to operate the hook and movable into position to lock said hook in uncoupled position, and guard devices arranged to engage when the hook is elevated independently of the cam and so prevent the latter from being moved automatically into position to lock the hook in uncoupled position, substantially as set forth.

5. The combination of the draw-head having an abutment, $A^2$, the hook having a limited backward movement and provided with a surface, F', arranged to engage the abutment $A^2$, and a cam for elevating the coupling-hook, substantially as set forth.

6. The hook having a bearing-face, F, and a guard or stop-shoulder, G, in rear thereof, combined with the cam having a bearing-surface, I, arranged to engage face F and a guard projection, i, and a connection between the cam and hook, all substantially as described, whereby the projection i may be adjusted into engagement with face F to lock the hook in uncoupled position, or may engage shoulder G to prevent the locking of the hook in uncoupled position when the hook is raised by the link entering the draw-head to automatically couple, substantially as set forth.

7. The combination of the draw-head, a hook, a cam for adjusting said hook, a stem connected with said cam, a shaft having at one end a knuckle-like joint with the stem, and having at its other or outer end a crank-arm, and a latch for securing said shaft, substantially as set forth.

8. In a car-coupling, the combination of a draw-head, a hook having its forward end arranged to bear against the inner wall of the draw-head and suitably supported, whereby it may have a limited vertical and longitudinal movement, a cam for operating said hook, and a loose connection between the hook and cam, substantially as set forth.

9. A car-coupling having the following elements, in combination, namely: a draw-head, a hook, C, a cam, H, for adjusting said hook, a connection, J, between said cam and hook, a stem connected with said cam and provided with an eye, L, and with a lateral crank-like lug, l, a connection, M, secured to said lug and extended to the top of the car, and the shaft having one end looped through the eye of the stem, all substantially as set forth.

GEO. J. FERGUSON.

Witnesses:
 SOLON C. KEMON,
 P. B. TURPIN.